US012617482B2

(12) United States Patent
Wang et al.

(10) Patent No.: US 12,617,482 B2
(45) Date of Patent: May 5, 2026

(54) VEHICLE FINAL ASSEMBLY LINE AND VEHICLE FINAL ASSEMBLY METHOD

(71) Applicant: CONTEMPORARY AMPEREX TECHNOLOGY (HONG KONG) LIMITED, Hong Kong (CN)

(72) Inventors: Hao Wang, Ningde (CN); Yongjie Li, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/642,303

(22) Filed: Apr. 22, 2024

(65) Prior Publication Data

US 2024/0270337 A1      Aug. 15, 2024

Related U.S. Application Data

(63) Continuation of application No. PCT/CN2022/074378, filed on Jan. 27, 2022.

(51) Int. Cl.
B62D 65/02          (2006.01)
B62D 65/12          (2006.01)
(Continued)

(52) U.S. Cl.
CPC ........... B62D 65/024 (2013.01); B62D 65/12 (2013.01); B62D 65/14 (2013.01); B62D 65/18 (2013.01);
(Continued)

(58) Field of Classification Search
CPC ...... B62D 65/024; B62D 65/12; B62D 65/14; B62D 65/18; B62D 65/022; B62D 65/02;
(Continued)

(56) References Cited

U.S. PATENT DOCUMENTS 6,641,195 B2 * 11/2003 Shikata ................ B62D 25/142
                                                                  296/70
9,183,572 B2 * 11/2015 Brubaker ............... G06Q 30/02
                        (Continued)

FOREIGN PATENT DOCUMENTS

CN          110937045 A      3/2020
CN          210149455 U      3/2020
                    (Continued)

OTHER PUBLICATIONS

The European Patent Office (EPO) The Extended European Search Report for Application No. 22922740.0 Dec. 12, 2024 9 Pages.
(Continued)

*Primary Examiner* — Lawrence Averick
(74) *Attorney, Agent, or Firm* — ANOVA LAW GROUP, PLLC

(57)          ABSTRACT

A vehicle includes an electric chassis provided with a navigation device and a vehicle body to be connected to the electric chassis. The navigation device is configured to control the electric chassis to travel according to a predetermined path. A vehicle final assembly line includes: a vehicle body positioning device, configured to position the vehicle body on the electric chassis to connect the vehicle body to the electric chassis at a marriage station when the navigation device controls the electric chassis to travel to the marriage station according to the predetermined path, and control the vehicle body and the electric chassis that are connected to each other to travel to a plurality of assembly stations in sequence according to the predetermined path so as to complete assembly of the vehicle at the plurality of assembly stations, and the assembled vehicle leaves the line at an end-of-line station.

7 Claims, 3 Drawing Sheets

(51) Int. Cl.

| | | |
|---|---|---|
| *B62D 65/14* | (2006.01) | |
| *B62D 65/18* | (2006.01) | |
| *G05D 1/646* | (2024.01) | |
| *G05D 107/70* | (2024.01) | |
| *G05D 109/10* | (2024.01) | |

(52) U.S. Cl.
CPC ......... *G05D 1/646* (2024.01); *G05D 2107/70* (2024.01); *G05D 2109/10* (2024.01)

(58) Field of Classification Search
CPC . G05D 1/646; G05D 2107/70; G05D 2109/10
See application file for complete search history.

(56) References Cited

U.S. PATENT DOCUMENTS

| | | | | |
|---|---|---|---|---|
| 9,878,666 | B2 * | 1/2018 | Brubaker ................ | B60R 11/02 |
| 10,108,186 | B2 * | 10/2018 | Klumpp ............. | G05B 19/4189 |
| 10,293,750 | B2 * | 5/2019 | Brubaker ................ | B60R 11/02 |
| 10,640,297 | B2 * | 5/2020 | Kilibarda ................ | B65G 35/06 |
| 10,699,305 | B2 * | 6/2020 | Ricci .................... | G01S 7/4021 |
| 10,740,796 | B2 * | 8/2020 | Brubaker .................. | G09F 9/30 |
| 11,692,845 | B2 * | 7/2023 | Kantarjiev ......... | G01C 21/3889 |
| | | | | 701/455 |
| 11,769,104 | B2 * | 9/2023 | Rockman ............... | G05D 1/646 |
| | | | | 705/332 |
| 12,128,975 | B2 * | 10/2024 | Kaphengst ......... | G05B 19/4155 |
| 12,371,116 | B2 * | 7/2025 | Jarsch .................... | B62D 65/18 |
| 12,372,961 | B2 * | 7/2025 | Rust ....................... | G05D 1/646 |
| 2002/0017798 | A1 * | 2/2002 | Shikata .............. | B60H 1/00535 |
| | | | | 296/70 |
| 2009/0299857 | A1 * | 12/2009 | Brubaker ............... | G06Q 30/02 |
| | | | | 455/99 |
| 2010/0129187 | A1 | 5/2010 | Nishihara | |
| 2014/0288690 | A1 * | 9/2014 | Klumpp ............. | G05B 19/4188 |
| | | | | 700/112 |
| 2015/0266421 | A1 * | 9/2015 | Brubaker ................ | B60R 11/02 |
| | | | | 348/148 |

| | | | | |
|---|---|---|---|---|
| 2016/0140614 | A1 * | 5/2016 | Brubaker ........... | G06Q 30/0266 |
| | | | | 705/14.62 |
| 2017/0200197 | A1 * | 7/2017 | Brubaker ............. | B60Q 1/2619 |
| 2018/0143035 | A1 * | 5/2018 | Ricci .................. | B62D 15/0265 |
| 2018/0304810 | A1 * | 10/2018 | Brubaker ................ | B60R 11/02 |
| 2018/0354083 | A1 * | 12/2018 | Thorwarth ........... | B23P 21/004 |
| 2019/0135549 | A1 * | 5/2019 | Kilibarda .............. | B62D 65/18 |
| 2020/0140028 | A1 | 5/2020 | Wells et al. | |
| 2020/0156722 | A1 | 5/2020 | Watkins et al. | |
| 2020/0378781 | A1 * | 12/2020 | Kantarjiev ......... | G01C 21/3691 |
| 2021/0394780 | A1 | 12/2021 | Thomas et al. | |
| 2021/0394845 | A1 | 12/2021 | Thomas et al. | |
| 2021/0397178 | A1 | 12/2021 | Thomas et al. | |
| 2021/0397180 | A1 | 12/2021 | Thomas et al. | |
| 2021/0398070 | A1 * | 12/2021 | Rockman ......... | G06Q 10/08355 |
| 2022/0348278 | A1 * | 11/2022 | Jarsch .................... | B62D 65/18 |
| 2023/0145508 | A1 * | 5/2023 | Kaphengst ....... | G05B 19/41805 |
| | | | | 701/24 |
| 2023/0229163 | A1 * | 7/2023 | Rust ..................... | G05D 1/0088 |
| | | | | 701/50 |

FOREIGN PATENT DOCUMENTS

| | | |
|---|---|---|
| CN | 111137376 A | 5/2020 |
| CN | 109552451 B | 1/2021 |
| CN | 113844568 A | 12/2021 |
| CN | 217170859 U | 8/2022 |

OTHER PUBLICATIONS

The World Intellectual Property Organization (WIPO) International Search Report for PCT/CN2022/074378 Oct. 11, 2022 7 Pages (including translation).

Liu Jinjin et al, "Design and Implementation of Passenger Vehicle Final Assembly Line", Production Equipment, Issue 6, 2020, DOI: 10.19710/J.cnki.1003-8817.20190412.

The First Office Action of the Chinese application No. 202280006563.4, issued on Nov. 15, 2025.18 Pages (including translation).

* cited by examiner

VEHICLE FINAL ASSEMBLY LINE AND VEHICLE FINAL ASSEMBLY METHOD

CROSS-REFERENCE TO RELATED APPLICATION

This application is a continuation of International Application No. PCT/CN2022/074378, filed on Jan. 27, 2022, the entire content of which is incorporated herein by reference.

TECHNICAL FIELD

The present application relates to the technical field of automobiles, and in particular to a vehicle final assembly line and a vehicle final assembly method.

BACKGROUND ART

A traditional passenger vehicle final assembly line usually includes an interior trim line, a chassis line, and an exterior assembly line. Most of original equipment manufacturers employ skid or slat-chain conveying for the interior trim line and the exterior assembly line, each of which has a specially-structured civil foundation, leading to inconvenience of reformation or capacity expansion, longer shutdown period, and high investment. The chassis line involves an operating platform for lower vehicle parts, and there is, therefore, a need for a fixture mechanical conveying line to create a lower body operating platform and form an assembly line. However, part of the fixture line has a fixed form and high initial investment, as well as high difficulty in late reformation and maintenance.

Accordingly, it is difficult for a traditional final assembly workshop to accommodate to the needs for fast response to existing markets. With the trend of rapid update of vehicle models and the trend of light-asset vehicle production, there is a more urgent need for a flexible, simplified, easily modifiable, and low-cost production line.

SUMMARY

Embodiments of the present application provide a vehicle final assembly line and a vehicle final assembly method, which can improve the vehicle final assembly efficiency greatly.

In a first aspect, provided is a vehicle final assembly line. A vehicle includes an electric chassis and a vehicle body to be assembled, the vehicle body is configured to be connected to the electric chassis, the electric chassis is provided with a navigation device, and the navigation device is configured to control the electric chassis to travel according to a predetermined path. The vehicle final assembly line includes: a vehicle body positioning device, configured to position the vehicle body on the electric chassis to connect the vehicle body to the electric chassis at a marriage station when the navigation device controls the electric chassis to travel to the marriage station according to the predetermined path; wherein the navigation device is further configured to: control the vehicle body and the electric chassis that are connected to each other to travel to a plurality of assembly stations in sequence according to the predetermined path so as to complete assembly of the vehicle at the plurality of assembly stations, and the assembled vehicle leaves the line at an end-of-line station.

Accordingly, with regard to the vehicle final assembly line of embodiments of the present application, as the electric chassis has travel mobility, by mounting the navigation device on the electric chassis, the electric chassis may be controlled by the navigation device to travel according to the predetermined path. Firstly, the navigation device may control the electric chassis to travel to a marriage station according to the predetermined path, the electric chassis is connected to the vehicle body at the marriage station, and a bottom operating platform in a traditional final assembly process is omitted, so creating the bottom operating platform by means of a fixture line is avoided. Secondly, the navigation device controls the electric chassis and the vehicle body that are connected to each other to undergo other assembly operations in sequence according to the predetermined path, so that a through mechanical conveying line is formed, and a large plate line for interior trims is omitted, greatly improving assembly efficiency. Moreover, with a plurality of navigation devices controlling a plurality of vehicles to be assembled, a vehicle final assembly line can be formed to assemble the vehicles in batches. There is no need for high investment in civil construction, the mechanical conveying form and adaptation form for final assembly are simplified, and reduced investment and shortened period are offered for mechanical conveying construction. Furthermore, an appropriate number of navigation devices may be equipped depending on a desired capacity.

During use of the vehicle final assembly line, arrangement of various assembly stations of the vehicle final assembly line may be adjusted and optimized constantly according to the process requirements. For example, it is possible to split a high-configuration installation process into off-line subassembly and re-online according to the requirements of different vehicle models, providing a high degree of flexibility and a compatibility with various vehicle model platforms. Specifically, when there is a need for reforming, or expanding capacity of, the vehicle final assembly line, it is possible to regulate a travel path stored in a navigation device, e.g., regulate a navigation magnetic guide strip or positioning code of the navigation device to alter the predetermined path stored therein or increase the number of navigation devices and regulate respective procedures, so that reforming is greatly simplified and little or no additional shutdown time is required.

In some embodiments, the electric chassis includes a lower body frame, a suspension system, a steering system, a braking system, a chassis electronics control system, and an energy storage system; and the suspension system, the steering system, the braking system, the chassis electronics control system, and the energy storage system are all mounted on the lower body frame.

Since the electric chassis has a travel control system integrated with the energy storage system such that the electric chassis may be connected preferentially to the vehicle body, a bottom operating platform during traditional final assembly is omitted, that is, creating the bottom operating platform by means of a fixture line is avoided, and there is no need for large civil construction investment, thus simplifying the mechanical conveying form and adaptation form of final assembly, and allowing for reduced investment and shorter period for mechanical conveying construction.

In some embodiments, the electric chassis further includes: a cooling heat pump system mounted on the lower body frame.

In some embodiments, at least one of the plurality of assembly stations includes a height adjusting apparatus, the height adjusting apparatus being configured to complete assembly operations at different heights of the vehicle body and the electric chassis that are connected to each other.

Given the plurality of assembly stations involve assembly operations on various components of the vehicle while different assembly operations have different height requirements for a vehicle to be assembled, it is therefore possible that by providing a height adjusting apparatus at an assembly station, the requirements of ergonomics can be met when the vehicle body and the electric chassis that are connected to each other have different requirements for assembly height, thereby avoiding large civil construction investment and lowering the cost of the vehicle final assembly line.

In some embodiments, the vehicle final assembly line further includes the navigation device, the navigation device being configured to be mounted to the electric chassis at a fixing station.

In some embodiments, the vehicle final assembly line further includes: an end-of-line device, configured to separate the assembled vehicle from the navigation device at the end-of-line station, to cause the assembled vehicle to leave the line. In this way, the navigation device separated from the vehicle can be re-used, such that the navigation device can continue to be used to control another vehicle to be assembled to undergo final assembly according to a predetermined path.

In some embodiments, after being separated from the assembled vehicle at the end-of-line station, the navigation device is arranged on an electric chassis of a next vehicle to be assembled, the navigation device is further configured to control the electric chassis of the next vehicle to be assembled to travel to the marriage station for carrying out a final assembly process of the next vehicle to be assembled, and so on, thereby forming a vehicle final assembly line. The reuse of the navigation device can further reduce the cost of the vehicle final assembly line.

In some embodiments, the plurality of assembly stations include: a plurality of interior trim assembly stations for performing interior trim assembly operations on the vehicle; and a plurality of exterior assembly stations for performing exterior assembly operations on the vehicle. The interior trim assembly operations for the vehicle are completed by means of the plurality of interior trim assembly stations and the plurality of exterior assembly stations.

In some embodiments, the vehicle final assembly line further includes: a pre-assembly device, configured to convey the vehicle body to be assembled from a vehicle body temporary storage zone to a front compartment pre-assembly station in front of the marriage station, to complete a front compartment pre-assembly operation at the front compartment pre-assembly station for the vehicle body to be assembled.

In a second aspect, provided is a vehicle final assembly method, including: controlling, by a navigation device, an electric chassis of a vehicle to travel to a marriage station according to a predetermined path, the navigation device being arranged on the electric chassis; positioning a vehicle body to be assembled of the vehicle on the electric chassis to connect the vehicle body to the electric chassis at the marriage station; controlling, by the navigation device, the vehicle body and the electric chassis that are connected to each other to travel to a plurality of assembly stations in sequence according to the predetermined path so as to complete assembly of the vehicle at the plurality of assembly stations; and causing the assembled vehicle to leave the line at an end-of-line station.

In some embodiments, the electric chassis includes a lower body frame, a suspension system, a steering system, a braking system, a chassis electronics control system, and an energy storage system; and the suspension system, the steering system, the braking system, the chassis electronics control system, and the energy storage system are all mounted on the lower body frame.

In some embodiments, the electric chassis further includes: a cooling heat pump system mounted on the lower body frame.

In some embodiments, at least one of the plurality of assembly stations includes a height adjusting apparatus, the height adjusting apparatus being configured to complete assembly operations at different heights of the vehicle body and the electric chassis that are connected to each other.

In some embodiments, the method further includes: mounting the navigation device to the electric chassis at a fixing station.

In some embodiments, causing the assembled vehicle to leave the line at an end-of-line station includes: causing the assembled vehicle to leave the line at the end-of-line station after separating the assembled vehicle from the navigation device.

In some embodiments, the method further includes: after separating the navigation device from the assembled vehicle at the end-of-line station, arranging the navigation device on an electric chassis of a next vehicle to be assembled, and controlling, by the navigation device, the electric chassis of the next vehicle to be assembled to travel to the marriage station.

In some embodiments, the plurality of assembly stations include: a plurality of interior trim assembly stations for performing interior trim assembly operations on the vehicle; and a plurality of exterior assembly stations for performing exterior assembly operations on the vehicle.

In some embodiments, the method further includes: conveying the vehicle body to be assembled from a vehicle body temporary storage zone to a front compartment pre-assembly station in front of the marriage station, and completing a front compartment pre-assembly operation at the front compartment pre-assembly station for the vehicle body to be assembled.

Figure 1:
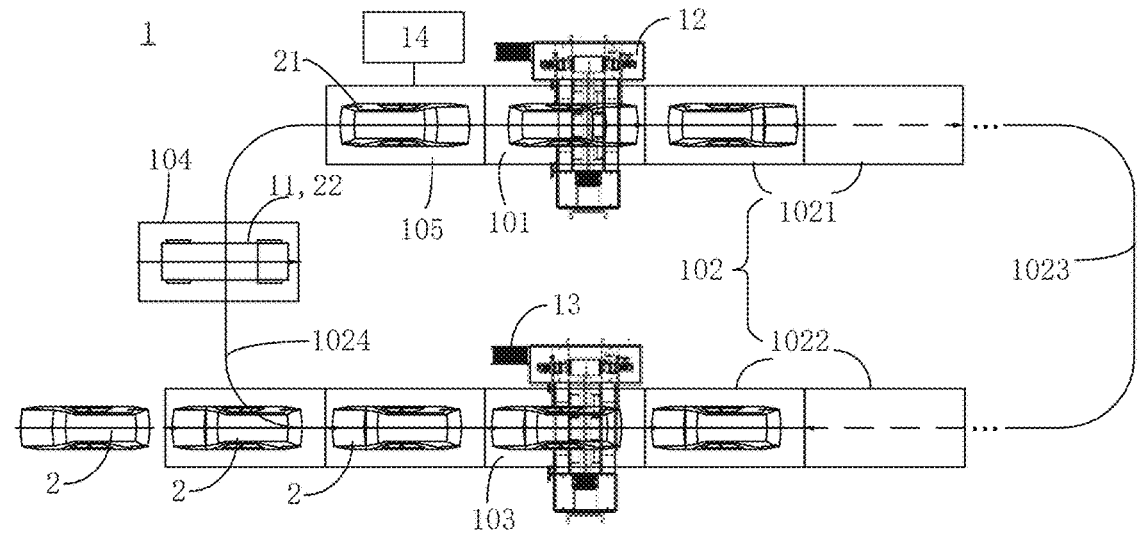
FIG. 1 is a schematic diagram of a vehicle final assembly line disclosed in an embodiment of the present application.

In the accompanying drawings, the figures are not necessarily drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example and are not intended to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of tolerance. The term "parallel" does not mean being parallel in the strict sense, but within an allowable range of tolerance.

The orientation terms in the following description all indicate directions shown in the accompanying drawings, and do not limit the specific structure in the present application. In the description of the present application, it should also be noted that the terms "mounting", "connect", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated device are merely illustrative and should not be construed to limit the present application in any way.

In a traditional vehicle final assembly scheme, a vehicle to be assembled has no mobility, and a lower body operating platform is required, that is, it is necessary to create the lower body operating platform and form an assembly line by means of various forms of mechanical conveying lines and mutual adaptations therebetween. Moreover, most of traditional final assembly lines employ interior trim skid line or slat-chain conveying, which involves civil constructions and needs large investment in fixed assets. In addition, the range for reforming and capacity expansion reforming is too wide in a later stage and the shutdown period is long, so that is impossible to accommodate to the needs for fast response to existing markets.

Accordingly, embodiments of the present application provide a vehicle final assembly line. A vehicle includes an electric chassis and a vehicle body to be assembled. As the electric chassis has travel mobility, by mounting a navigation device on the electric chassis, the electric chassis may be controlled by the navigation device to travel according to a predetermined path. Firstly, the navigation device controls the electric chassis to travel to a marriage station according to the predetermined path, so as to connect the vehicle body to the electric chassis at the marriage station without the need for operating a lower body during subsequent assembly. Secondly, the navigation device controls the vehicle body and the electric chassis that are connected to each other to travel according to the predetermined path to pass through a plurality of assembly stations in sequence so as to complete assembly of the vehicle. The vehicle final assembly line can complete various assembly operations simply by mounting the navigation device on the electric chassis. With a plurality of navigation devices controlling a plurality of vehicles to be assembled, a vehicle final assembly line can be formed to assemble the vehicles in batches. Interior trim large plate lines and chassis marriage fixture lines in traditional methods are omitted, so that the assembly efficiency is greatly improved. Moreover, when there is a need for reforming, or expanding capacity of, the final assembly line, it is possible to regulate a predetermined path controlled by the navigation device, e.g., regulate a navigation magnetic guide strip or positioning code within the navigation device to alter the travel path or increase the number of navigation devices and regulate respective procedures, to achieve reforming or capacity expanding, so that reforming is greatly simplified and little or no additional shutdown time is required.

FIG. 1 shows a schematic diagram of a vehicle final assembly line 1 according to an embodiment of the present application. As shown in FIG. 1, the vehicle final assembly line 1 may be configured to assemble a vehicle 2, the vehicle 2 includes an electric chassis 22 and a vehicle body 21 to be assembled, and the vehicle body 21 is configured to be connected to the electric chassis 22. The electric chassis 22 is provided with a navigation device 11, and the navigation device 11 is configured to control the electric chassis 22 to travel according to a predetermined path. Specifically, the vehicle final assembly line 1 includes: a vehicle body positioning device 12, configured to position the vehicle body 21 on the electric chassis 22 to connect the vehicle body 21 to the electric chassis 22 at a marriage station 101 when the navigation device 11 controls the electric chassis 22 to travel to the marriage station 101 according to the predetermined path. The navigation device 11 is further configured to: control the vehicle body 21 and the electric chassis 22 that are connected to each other to travel a plurality of assembly stations 102 in sequence according to the predetermined path so as to complete assembly of the vehicle 2 at the plurality of assembly stations 102, and the assembled vehicle 2 leaves the line at an end-of-line station 103.

It is to be understood that the vehicle 2 according to an embodiment of present application may be a new energy vehicle, which may be a battery electric vehicle or a hybrid electric vehicle. Specifically, the electric chassis 22 of the vehicle 2 includes an energy storage system. For example, the energy storage system may include a battery for powering the vehicle 2.

Accordingly, with regard to the vehicle final assembly line 1 of the embodiments of the present application, as the electric chassis 22 has travel mobility, by mounting the navigation device 22 on the electric chassis 11, the electric chassis 22 may be controlled by the navigation device 11 to travel according to the predetermined path. Firstly, the navigation device 11 may control the electric chassis 22 to travel to a marriage station 101 according to the predetermined path, the electric chassis 22 is connected to the vehicle body 21 at the marriage station 101, and a bottom operating platform in a traditional final assembly process is omitted, so creating the bottom operating platform by means of a fixture line is avoided. Secondly, the navigation device 11 controls the electric chassis 22 and the vehicle body 21 that are connected to each other to undergo other assembly operations in sequence according to the predetermined path, so that a through mechanical conveying line is formed, and a large plate line for interior trims is omitted, greatly improving assembly efficiency. Moreover, with a plurality of navigation devices 11 controlling a plurality of vehicles 2 to be assembled, a vehicle final assembly line can be formed to assemble the vehicles 2 in batches. There is no need for high investment in civil construction, the mechanical conveying form and adaptation form for final assembly are simplified, and reduced investment and shortened period are offered for mechanical conveying construction. Furthermore, an appropriate number of navigation devices 11 may be equipped depending on a desired capacity.

During use of the vehicle final assembly line 1, arrangement of various assembly stations of the vehicle final assembly line 1 may be adjusted and optimized constantly according to the process requirements. For example, it is possible to split a high-configuration installation process into off-line subassembly and re-online according to the requirements of different vehicle models, providing a high degree of flexibility and a compatibility with various vehicle model platforms. Specifically, when there is a need for reforming, or expanding capacity of, the vehicle final assembly line 1, it is possible to regulate a travel path stored in a navigation device 11, e.g., regulate a navigation magnetic guide strip or positioning code of the navigation device 11 to alter the predetermined path stored therein or increase the number of navigation devices 11 and regulate respective procedures, so that reforming is greatly simplified and little or no additional shutdown time is required.

Figure 2:
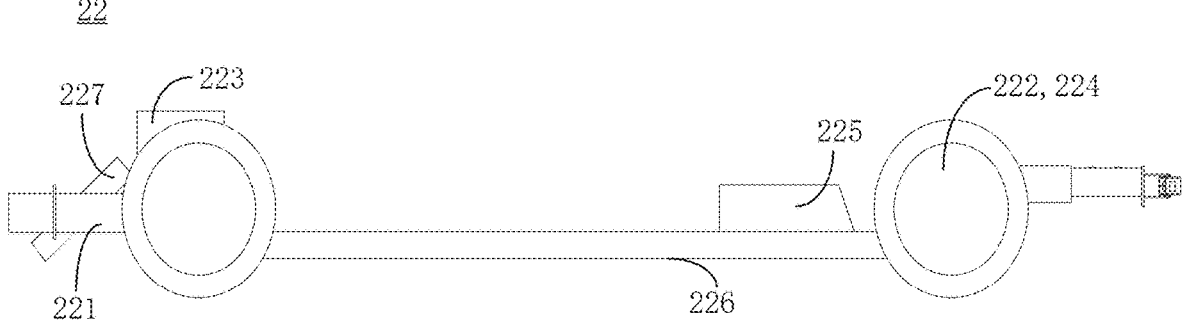
FIG. 2 is a schematic structural diagram of an electric chassis of a vehicle disclosed in an embodiment of the present application.

It is to be understood that the electric chassis 22 of the embodiments of the present application may be an integrated structure of a vehicle chassis and an energy storage system, and the electric chassis 22 has travel ability. For example, the electric chassis 22 may refer to a lower body of a vehicle 2 having a travel control system integrated with the energy storage system. For example, FIG. 2 shows a schematic diagram of an electric chassis 22 according to an embodiment of the present application. As shown in FIG. 2, the electric chassis 22 may include a lower body frame 221, a suspension system 222, a steering system 223, a braking system 224, a chassis electronics control system 225, and an energy storage system 226. The suspension system 222, the steering system 223, the braking system 224, the chassis electronics control system 225, and the energy storage system 226 are all mounted on the lower body frame 221. For example, FIG. 2 shows a possible arrangement of the suspension system 222, the steering system 223, the braking system 224, the chassis electronics control system 225, and the energy storage system 226 on the lower body frame 221, but the embodiments of the present application are not limited thereto.

Specifically, the suspension system 222 in the embodiments of the present application may refer to a general term for any force transmission and connection device between the lower body frame 221 and an axle or wheel of the vehicle 2, and has functions of transmitting force and torque between the wheel and the frame, and cushioning impact force transmitted from an uneven road surface to the frame or to vehicle body 21 and attenuating vibrations caused thereby, so as to ensure that the vehicle 2 travels smoothly.

The steering system 223 of the vehicle 2 may be configured to change or maintain a traveling or reversing direction of the vehicle 2.

The braking system 224 of the vehicle 2 may be configured to positively reduce a traveling speed of the vehicle 2, and has main functions of slowing down or even stopping the traveling vehicle 2, keeping the speed of the vehicle 2 traveling downhill stable, and keeping the stopped vehicle 2 stationary.

The chassis electronics control system 225 of the vehicle 2 may include an electronics control module, and may further include a harness and a piping system for controlling the electric chassis 22.

The energy storage system 226 of the vehicle 2 may be configured to power the vehicle 2. For example, a battery of the energy storage system may serve as a power source for operating the vehicle 2 for use in a circuit system of the vehicle 2, e.g., to meet the working power demand of the vehicle 2 during startup, navigation, and running. In another embodiment of the present application, the battery of the energy storage system may not only serve as a power source for operating the vehicle 2, but may also serve as a power source for driving the vehicle 2, instead of or partially instead of fuel or natural air, to provide driving power for the vehicle 2, and the embodiments of the present application are not limited thereto.

Optionally, as shown in FIG. 2, the electric chassis 22 may further include: a cooling heat pump system 227. Specifically, the cooling heat pump system 227 may be mounted on the lower body frame 221, for example, in a position shown in FIG. 2, or in other positions. The cooling heat pump system 227 may be configured to provide heat for components that may generate heat during traveling of the vehicle 2, or to cool components of the vehicle 2, or to provide heat for or cool an interior space of the vehicle 2. For example, the cooling heat pump system 227 may include an air conditioner of the vehicle 2, and the embodiments of the present application are not limited thereto.

In an embodiment of the present application, as shown in FIG. 1, before the navigation device 11 controls conveying of the electric chassis to the marriage station 101, it is optionally possible to arrange the navigation device 11 on the electric chassis 22 at a fixing station 104, so that the navigation device 11 can control the electric chassis 22 to travel to the marriage station 101.

Figure 3:
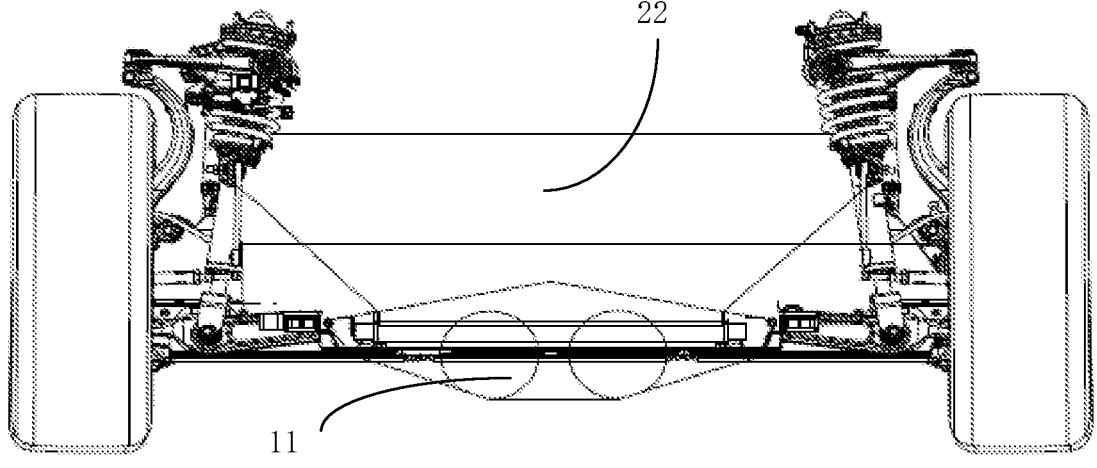
FIG. 3 is a schematic structural diagram of an electric chassis provided with a navigation device, disclosed in an embodiment of the present application.

FIG. 3 shows a schematic diagram of an electric chassis 22 provided with a navigation device 11 according to an embodiment of the present application. As shown in FIGS. 1 and 3, the navigation device 11 is configured to be mounted to the electric chassis 22 at the fixing station 104. Specifically, at the fixing station 104, the navigation device 1 may be arranged on the electric chassis 22 by manual or mechanical means etc., for example, it may be mounted on a lower surface of the electric chassis 22 as shown in FIG. 3, or may be mounted in other positions of the electric chassis 22, so that the navigation device 11 may control the electric chassis 22 to travel along various stations of the vehicle final assembly line 1 in sequence according to the predetermined path. Optionally, the navigation device 11 may be fixed to the electric chassis 22 in a variety of ways. For example, the electric chassis 22 and the navigation device 11 may be fixed relatively by means of a detachable structure or a non-detachable structure, so that when the electric chassis 22 passes through the subsequent marriage station 101 and each assembly station 102, the navigation device 11 always remains stable to avoid disengagement, assembly of the components of the vehicle 2 can not be affected, and the final assembly efficiency is improved.

In an embodiment of the present application, a vehicle body positioning device 12 of the vehicle final assembly line 1 positions a vehicle body 21 on an electric chassis 22 to connect the vehicle body 21 to the electric chassis 22 at the marriage station 101.

It is to be understood that before the vehicle body positioning device 12 of the embodiment of the present application positions the vehicle body 21 on the electric chassis 22, that is, before the vehicle body 22 is not connected to the electric chassis 22, the vehicle body 22 may be referred to as a vehicle body 22 to be assembled. The vehicle body 22 to be assembled may refer to a vehicle body 22 to be assembled that is conveyed directly from a vehicle body temporary storage zone. Alternatively, the vehicle body 22 to be assembled may be a vehicle body 22 to be assembled that has undergone a pre-assembly operation.

Figure 4:
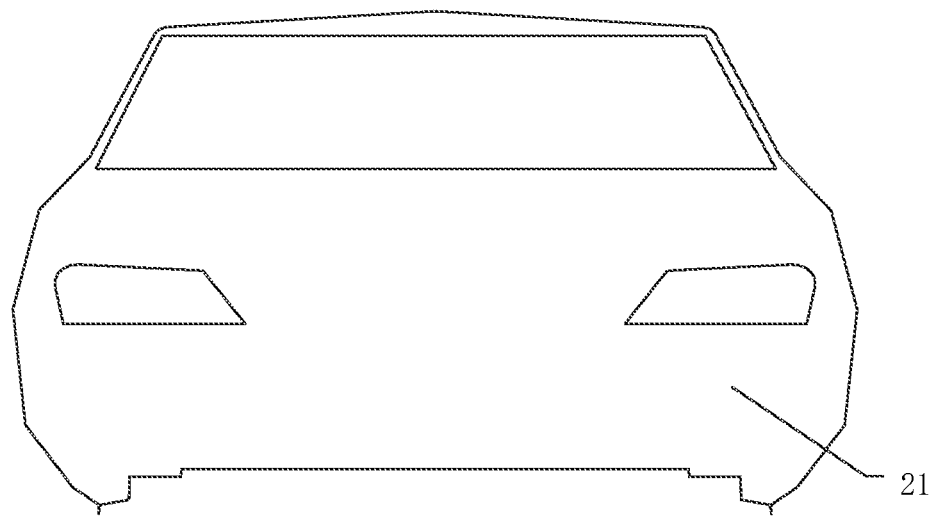
FIG. 4 is a schematic structural diagram of a vehicle body disclosed in an embodiment of the present application.

FIG. 4 shows a schematic diagram of a vehicle body 22 to be assembled according to an embodiment of the present application. Optionally, with reference to FIGS. 1 and 4, the vehicle final assembly line 1 further includes: a pre-assembly device 14, configured to convey the vehicle body 21 to be assembled from a vehicle body temporary storage zone to a front compartment pre-assembly station 105 in front of the marriage station 101, to complete a front compartment pre-assembly operation at the front compartment pre-assembly station 105 for the vehicle body 21 to be assembled. Specifically, the front compartment pre-assembly station 105 may be used for carrying out the front compartment pre-assembly operation. For example, the front compartment pre-assembly operation may include assembly operations of an air conditioning system and a front compartment harness, and the embodiments of the present application are not limited thereto.

Figure 5:
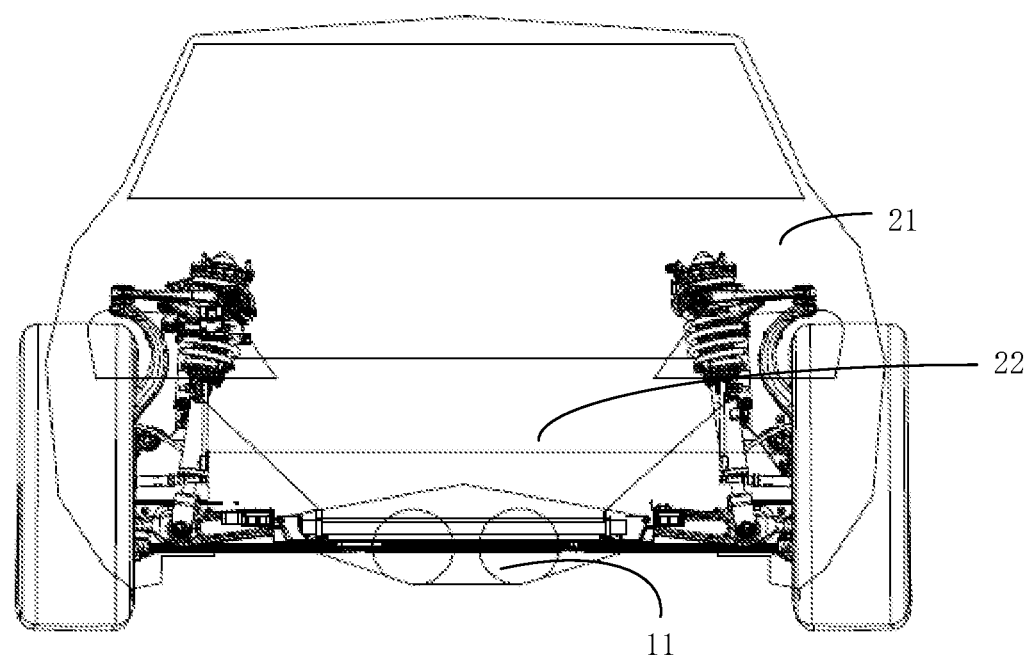
FIG. 5 is a schematic structural diagram of a vehicle body and an electric chassis that are connected to each other, disclosed in an embodiment of the present application.

FIG. 5 shows a schematic diagram of a vehicle body 21 and an electric chassis 22 that are connected to each other, according to an embodiment of the present application. As shown in FIGS. 1 and 5, the vehicle body 21 is connected to the electric chassis 22 at a marriage station 101. Optionally, the electric chassis 22 of the embodiment of the present application is in a substantially completed state, and the marriage station 101 of the vehicle final assembly production line 1 is mainly responsible for butt joint of mechanical, electrical, liquid pipelines of the vehicle body 21 and the electric chassis 22 and other processes.

In the embodiment of the present application, with regard to the vehicle body 21 and the electric chassis 22 that are connected to each other, the electric chassis 22 may be controlled by the navigation device 11, such that the electric chassis 22 and the vehicle body 21 connected thereto travel according to a predetermined path, passing through a plurality of assembly stations 102 in sequence to complete assembly of the vehicle 2. It is to be understood that FIG. 1 simplifies the plurality of assembly stations 102, and does not show all the assembly stations 102.

Optionally, as shown in FIG. 1, the plurality of assembly stations 102 according to the embodiment of the present application may include: a plurality of interior trim assembly stations 1021 and a plurality of exterior assembly stations 1022. Specifically, the plurality of interior trim assembly stations 1021 are used for performing interior trim assembly operations on the vehicle 2. For example, the interior trim assembly operations may include assembly operations on some or all of the following components: a main harness and a front compartment harness, an antiblock brake system (ABS) module and a braking pipeline, a front compartment air conditioning pipe, an electronic control module, a sunroof, an instrument panel, a roof, a carpet, a console, front and rear windshields, and an exterior trim.

Similarly, the plurality of exterior assembly stations 1022 are used for performing exterior assembly operations on the vehicle 2. For example, the exterior assembly operations may include assembly operations on some or all of the following components: a front-end module, headlights, seats, front and rear bumpers, tires, a fuel filler and an electrical check out system (ECOS).

Optionally, as shown in FIG. 1, the vehicle final assembly line 1 of the embodiment of the present application may further include at least one turning path 1023. Given the vehicle final assembly line 1 may include a plurality of assembly stations 102, in order to make reasonable use of space, the vehicle final assembly line 1 may further include at least one turning path 1023 to increase the site utilization rate. For example, the vehicle final assembly line 1 may include one turning path 1023, and two ends of the turning path 1023 are respectively configured to be connected to the plurality of interior trim assembly stations 1021 and the plurality of exterior assembly stations 1022, so that not only can the interior trim assembly stations 1021 and the exterior assembly stations 1022 be separated, but also the site and the space can be rationally utilized.

Optionally, at least one assembly station 102 of the plurality of assembly stations 102 includes a height adjusting apparatus for completing assembly operations at different heights of the vehicle body 21 and the electric chassis 22 that are connected to each other. Given the plurality of assembly stations 102 involve assembly operations on various components of the vehicle 2 while different assembly operations have different height requirements for a vehicle 2 to be assembled, it is therefore possible that by providing a height adjusting apparatus at an assembly station 102, the requirements of ergonomics can be met when the vehicle body 21 and the electric chassis 22 that are connected to each other have different requirements for assembly height, thereby avoiding large civil construction investment and lowering the cost of the vehicle final assembly line 1.

Optionally, the height adjusting apparatus of the embodiment of the present application may have a variety of different forms. For example, the height adjusting apparatus may be a step stool provided on the assembly station 102, so that a worker can complete, on the step stool, an assembly operation at a higher height that the vehicle 2 requires. For another example, the height adjusting apparatus may also be a ground pit region provided at the assembly station 102, so that a worker can complete, within the ground pit region, an assembly operation at a lower height for the vehicle 2. For still another example, the height adjusting apparatus may also be a device having a lifting function, so that a worker or a machine can complete the assembly operations on the vehicle 2 at different heights. Alternatively, the height adjusting apparatus may be used to lift the vehicle 2, but the embodiments of the present application are not limited thereto.

In an embodiment of the present application, as shown in FIG. 1, the assembled vehicle 2 leaves the line at an end-of-line station 103. Optionally, the vehicle final assembly line 1 according to an embodiment of the present application may further include an end-of-line device 13. The end-of-line device 13 separates the assembled vehicle 2 from the navigation device 11 at the end-of-line station 103, to cause the assembled vehicle 2 to leave the line. Taking FIG. 1 as an example, at the end-of-line station 103, after the end-of-line device 13 separates the navigation device 11 from the assembled vehicle 2, the navigation device 11 may be arranged on an electric chassis 22 of a next vehicle 2 to be assembled, and the navigation device 11 is further configured to control the electric chassis 22 of the next vehicle 2 to be assembled to travel to the marriage station 101.

Specifically, as shown in FIG. 1, the assembled vehicle 2 is separated from the navigation device 11, and the vehicle 2 may travel away from the vehicle final assembly line 1 for the next processing. The navigation device 11 separated from the vehicle 2 may be conveyed to the fixing station 104 along a path 1024 so that the navigation device 11 is arranged on the electric chassis 22 of the next vehicle 2 to be assembled, and the navigation device 11 then will control the electric chassis 22 of the next vehicle 2 to be assembled to travel to the marriage station 101 so as to commence a final assembly process for the next vehicle 2 to be assembled. By analogy, the navigation device 11 can be reused in the vehicle final assembly line 1 to control multiple vehicles to be assembled to travel according to a predetermined path in order to complete final assembly, and a final assembly line for vehicles 2 is thus formed. The reuse of the navigation device 11 can further reduce the cost of the vehicle final assembly line 1.

It is be understood that in order for the navigation device 11 to be separable from the vehicle 2, the navigation device 11 may be fixed to the vehicle 2 via a detachable structure at the fixing station 104, such that at the end-of-line station 103, the navigation device 11 is separated from the vehicle 2.

Optionally, the navigation device 11 of the embodiment of the present application may also not be separated from the assembled vehicle 2. Specifically, at the end-of-line station 103, the assembled vehicle 2 carries the navigation device 11 while leaving the line, so that the navigation device 11 does not enter an assembly process of the next vehicle 2. In this way, it is possible to increase the speed of the vehicle final assembly line 1 without repeatedly detaching the navigation device 11, thereby improving the production efficiency of the vehicle 2.

The vehicle final assembly line 1 according to the embodiments of the present application is described above, and a vehicle final assembly method 300 according to embodiments of the present application will be described below. For the parts not described in detail, reference may be made to the foregoing embodiments.

Figure 6:
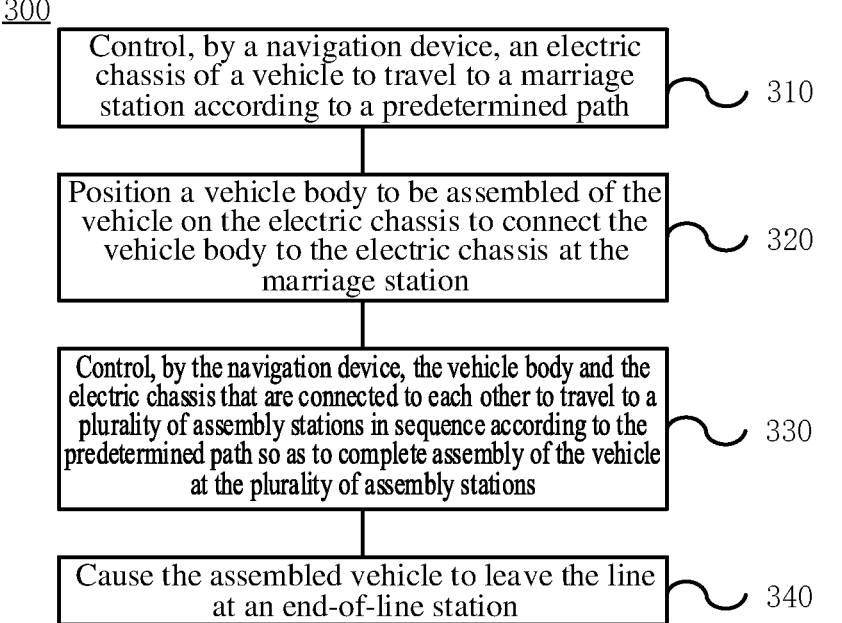
FIG. 6 is a schematic flowchart of a vehicle final assembly method disclosed in an embodiment of the present application.

FIG. 6 shows a schematic flowchart of a vehicle final assembly method 300 according to an embodiment of the present application. As shown in FIG. 6, the method 300 includes: a step S310 of controlling, by a navigation device 11, an electric chassis 22 of a vehicle 2 to travel to a marriage station 101 according to a predetermined path, the navigation device 11 being arranged on the electric chassis 22; a step S320 of positioning a vehicle body 21 to be assembled of the vehicle 2 on the electric chassis 22 to connect the vehicle body 21 to the electric chassis 22 at the marriage station 101; a step S330 of controlling, by the navigation device 11, the vehicle body 21 and the electric chassis 22 that are connected to each other to travel to a plurality of assembly stations 102 in sequence according to the predetermined path so as to complete assembly of the vehicle 2 at the plurality of assembly stations 102; and a step S340 of causing the assembled vehicle 2 to leave the line at an end-of-line station 103.

In some embodiments, the electric chassis 22 comprises a lower body frame 221, a suspension system 222, a steering system 223, a braking system 224, a chassis electronics control system 225, and an energy storage system 226; and the suspension system 222, the steering system 223, the braking system 224, the chassis electronics control system 225, and the energy storage system 226 are all mounted on the lower body frame 221.

In some embodiments, the electric chassis 22 further includes: a cooling heat pump system 227. The cooling heat pump system 227 is mounted on the lower body frame 221.

In some embodiments, at least one assembly station 102 of the plurality of assembly stations 102 comprises a height adjusting apparatus, the height adjusting apparatus being configured to complete assembly operations at different heights of the vehicle body 21 and the electric chassis 22 that are connected to each other.

In some embodiments, the method 300 further includes: mounting the navigation device 11 to the electric chassis 22 at a fixing station 104.

In some embodiments, causing the assembled vehicle 2 to leave the line at an end-of-line station 103 specifically includes: causing the assembled vehicle 2 to leave the line at the end-of-line station 103 after separating the assembled vehicle 2 from the navigation device 11.

In some embodiments, the method 300 further includes: after separating the navigation device 11 from the assembled vehicle 2 at the end-of-line station 103, arranging the navigation device 11 on an electric chassis 22 of a next vehicle 2 to be assembled, and controlling, by the navigation device 11, the electric chassis 22 of the next vehicle 2 to be assembled to travel to the marriage station 101.

In some embodiments, the plurality of assembly stations 102 include: a plurality of interior trim assembly stations 1021 for performing interior trim assembly operations on the vehicle 2; and a plurality of exterior assembly stations 1022 for performing exterior assembly operations on the vehicle 2.

In some embodiments, the method 300 further includes: conveying the vehicle body 21 to be assembled from a vehicle body temporary storage zone to a front compartment pre-assembly station 105 in front of the marriage station 101, and completing a front compartment pre-assembly operation at the front compartment pre-assembly station 105 for the vehicle body 21 to be assembled.

Although the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A vehicle final assembly line, wherein a vehicle comprises an electric chassis and a vehicle body to be assembled, the vehicle body is configured to be connected to the electric chassis, the electric chassis comprises a lower body frame, a suspension system, a steering system, a braking system, and a chassis electronics control system, and an energy storage system, the electric chassis has travel mobility, wherein the energy storage system comprises a battery, the electric chassis is provided with an automatic navigation device for use in the vehicle final assembly line, the automatic navigation device is configured to control the electric chassis to travel according to a predetermined path stored in a memory of the automatic navigation device by using a navigation magnetic guide strip or positioning code for the automatic navigation device, the vehicle final assembly line comprising:

a vehicle body positioning device, configured to:

position the vehicle body on the electric chassis to connect the vehicle body to the electric chassis at a marriage station when the automatic navigation device controls the electric chassis to travel to the marriage station according to the predetermined path stored in the memory of the automatic navigation device by using the navigation magnetic guide strip or positioning code for the automatic navigation device;

wherein the automatic navigation device is further configured to control the vehicle body and the electric chassis that are connected to each other to travel to a plurality of assembly stations in sequence according to the predetermined path stored in the memory of the automatic navigation device by using the navigation magnetic guide strip or positioning code for the automatic navigation device so as to complete assembly of the vehicle at the plurality of assembly stations, and the assembled vehicle leaves the line at an end-of-line station.

2. The vehicle final assembly line according to claim 1, wherein the suspension system, the steering system, the braking system, the chassis electronics control system, and the energy storage system are all mounted on the lower body frame.

3. The vehicle final assembly line according to claim 2, wherein the electric chassis further comprises: a cooling heat pump system, the cooling heat pump system being mounted on the lower body frame.

4. The vehicle final assembly line according to claim 1, wherein at least one assembly station of the plurality of assembly stations comprises a height adjusting apparatus, the height adjusting apparatus being configured for assembly operations at different heights of the vehicle body and the electric chassis that are connected to each other, the height adjusting apparatus being a step stool provided on the at least one assembly station, a ground pit region provided at the at least one assembly station, or a lifting device.

5. The vehicle final assembly line according to claim 1, further comprising:

the automatic navigation device, the automatic navigation device being configured to be mounted to the electric chassis at a fixing station.

6. The vehicle final assembly line according to claim 1, wherein:

the automatic navigation device is arranged on an electric chassis of a next vehicle to be assembled after being separated from the assembled vehicle at the end-of-line station; and the automatic navigation device is further configured to control the electric chassis of the next vehicle to be assembled to travel to the marriage station according to the predetermined path stored in the memory of the automatic navigation device by using the navigation magnetic guide strip or positioning code for the automatic navigation device.

7. The vehicle final assembly line according to claim 1, wherein the plurality of assembly stations comprise:

a plurality of interior trim assembly stations for performing interior trim assembly operations on the vehicle; and a plurality of exterior assembly stations for performing exterior assembly operations on the vehicle.

* * * * *